(12) United States Patent
Bottiglieri (10) Patent No.: US 6,789,856 B2
(45) Date of Patent: Sep. 14, 2004

(54) VEHICLE PARKING BRAKE LOCKOUT DEVICE

(76) Inventor: Peter Bottiglieri, 21610 River Road, Maple Ridge, British Columbia (CA), V2X 2B7

( * ) Notice: Subject to any disclaimer, the term of this patent is extended or adjusted under 35 U.S.C. 154(b) by 0 days.

(21) Appl. No.: 09/966,252

(22) Filed: Oct. 1, 2001

(65) Prior Publication Data

US 2003/0062766 A1 Apr. 3, 2003

(51) Int. Cl.[7] .......................... B60T 17/16; F16K 11/10
(52) U.S. Cl. .................. 303/89; 137/556; 137/627.5
(58) Field of Search .................. 303/89; 137/627.5, 137/625.66, 113, 383; 251/13, 62, 89.5

(56) References Cited

U.S. PATENT DOCUMENTS

| | | | |
|---|---|---|---|
| 2,031,062 A | 2/1936 | Peabody et al. | |
| 2,285,369 A | 6/1942 | Smith | |
| 2,327,559 A | 8/1943 | Reavis | |
| 2,723,009 A | 11/1955 | Kordas et al. | |
| 2,789,667 A | 4/1957 | Tannenbaum et al. | |
| 2,871,999 A | 2/1959 | Hemphill | |
| 3,127,966 A | 4/1964 | Sheriff et al. | |
| 3,682,195 A | * 8/1972 | Cvetkovich | 137/384.6 |
| 3,842,950 A | 10/1974 | Fontaine | |
| 4,306,586 A | * 12/1981 | Spencer | 137/556 |
| 5,036,961 A | 8/1991 | Eberling et al. | |
| 5,203,616 A | 4/1993 | Johnson | |
| 5,344,221 A | * 9/1994 | MacWilliam | 303/89 |

OTHER PUBLICATIONS

"British Columbia Air Brake Manual" pp. 24–27, Ministry of Solicitor General, Motor Vehicle Branch, May, 1991.

* cited by examiner

Primary Examiner—Christopher P. Schwartz
(74) Attorney, Agent, or Firm—Oyen Wiggs Green & Mutala (57) ABSTRACT

A lockout device couplable between a pneumatically-operable vehicle parking brake and a plunger-actuated control valve. The plunger is movable between a brake-disengaging position in which pressurized air flows through the control valve to the parking brake, and a brake-engaging position in which such air flow is prevented. The device has a shaft which is rotatable with respect to the plunger. The shaft has recessed and non-recessed portions. The plunger has a second recess. A key is removably couplable to the shaft and is rotatable between an engaged position in which the shaft's non-recessed portion protrudes into the second recess while the plunger is in the brake-engaging position, preventing movement of the plunger into the brake-disengaging position; and, a disengaged position in which the recessed portion of the shaft intersects the second recess, permitting movement of the plunger between the brake-disengaging and engaging positions.

6 Claims, 6 Drawing Sheets

VEHICLE PARKING BRAKE LOCKOUT DEVICE

TECHNICAL FIELD

This invention pertains to a key-actuated parking brake engagement/disengagement control for air brake equipped vehicles.

BACKGROUND

Air brake equipped vehicles such as trucks and buses normally utilize spring-type parking brakes. Air pressure is applied to disengage a spring mechanism in order to disengage the parking brakes. When the air pressure is relieved, the spring mechanism engages the parking brakes, which remain engaged until the air pressure is reapplied. A control valve allows the vehicle driver to exhaust air from the parking brake pneumatic circuit to engage the parking brakes; and, to repressurize the circuit in order to disengage the parking brakes.

There have been instances in which drivers have forgotten to actuate the parking brake control valve before leaving the vehicle. If the control valve is not properly actuated, the parking brakes are not engaged. There have been "roll away" incidents in which driverless buses have caused serious injuries while rolling away from a parked position, due to driver failure to operate the control valve so as to engage the parking brakes.

Although most trucks are equipped with a key-operated ignition switch, this is not universally true of buses. Many buses have an ignition switch which can be operated without a key. This invention provides a key-operated device which controls the vehicle parking brake (pneumatic) circuit to reduce the potential for vehicle "roll away" due to driver failure to engage the parking brakes.

SUMMARY OF INVENTION

The invention provides a vehicle brake lockout device for coupling between a pneumatically-operable vehicle parking brake and a pneumatic control valve. The control valve has a plunger which the vehicle driver can move between a brake-disengaging position in which pressurized air flows from a pressurized air supply through the control valve to the parking brake, and a brake-engaging position in which such air flow is prevented. In one embodiment, the device incorporates a shaft which can be rotated with respect to the plunger. The shaft has recessed and non-recessed portions. The plunger has a second recess. A key can be removably coupled to the shaft and rotated between engaged and disengaged positions. If the plunger is in the brake-engaging position then the key can be moved into the key's engaged position. This causes the non-recessed portion of the shaft to protrude into the plunger's recess, preventing movement of the plunger into the brake-disengaging position. In the key's disengaged position, the recessed portion of the shaft intersects the plunger's recess, permitting movement of the plunger between the brake-disengaging and engaging positions.

An optional switch can be coupled to the shaft such that the switch has a first electrical conductivity state when the key is in its engaged position and a second electrical conductivity state when the key is in its disengaged position. These switch states can be used for any desired purpose, such as controlling the vehicle's ignition circuit. A second recessed portion on the shaft can be positioned adjacent the switch such that the switch is actuated into its first electrical conductivity state when the shaft's second recessed portion is rotated into contact with the switch; with the switch being actuated into its second electrical conductivity state when the shaft's second recessed portion is rotated away from contact with the switch.

An optional solenoid can be electrically connected to the vehicle's ignition circuit. The solenoid has one operating state when the ignition circuit is energized and a second operating state when the ignition circuit is de-energized. The solenoid has a plug which is projected into or withdrawn from the plunger's recess, depending on the solenoid's operating state.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
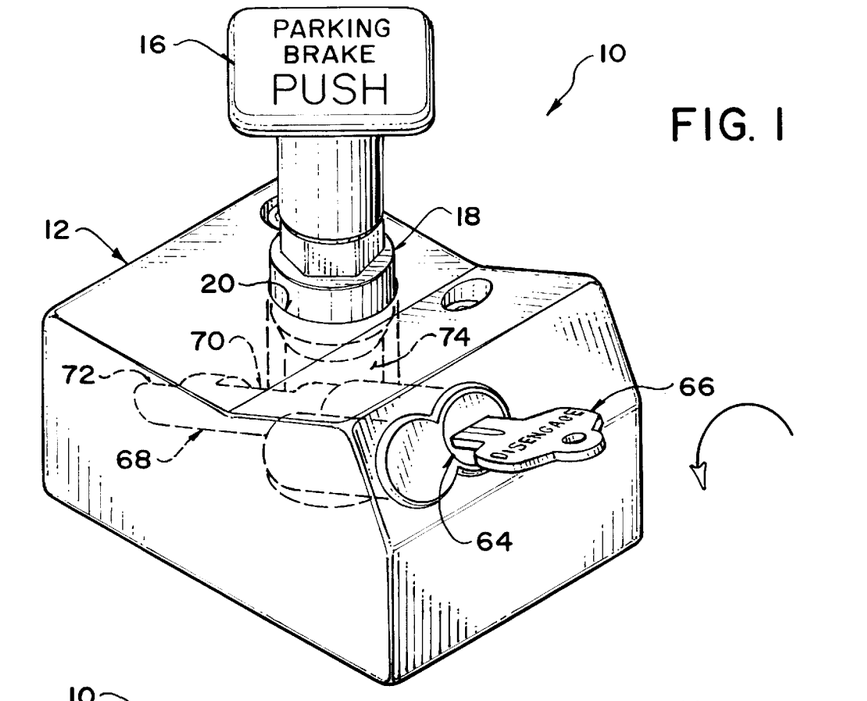
FIG. 1 is an oblique pictorial illustration of a vehicle parking brake lockout device in accordance with the invention, shown in the "parking brake disengaged" position.
Figure 2:
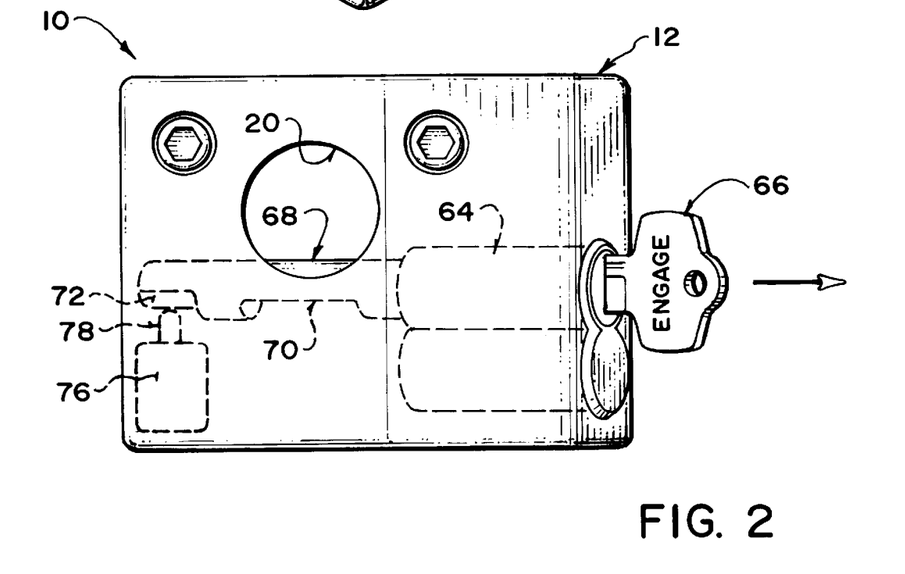
FIG. 2 is a top plan view of the FIG. 1 apparatus, excluding the plunger, shown in the "parking brake engaged" position.
Figure 3:
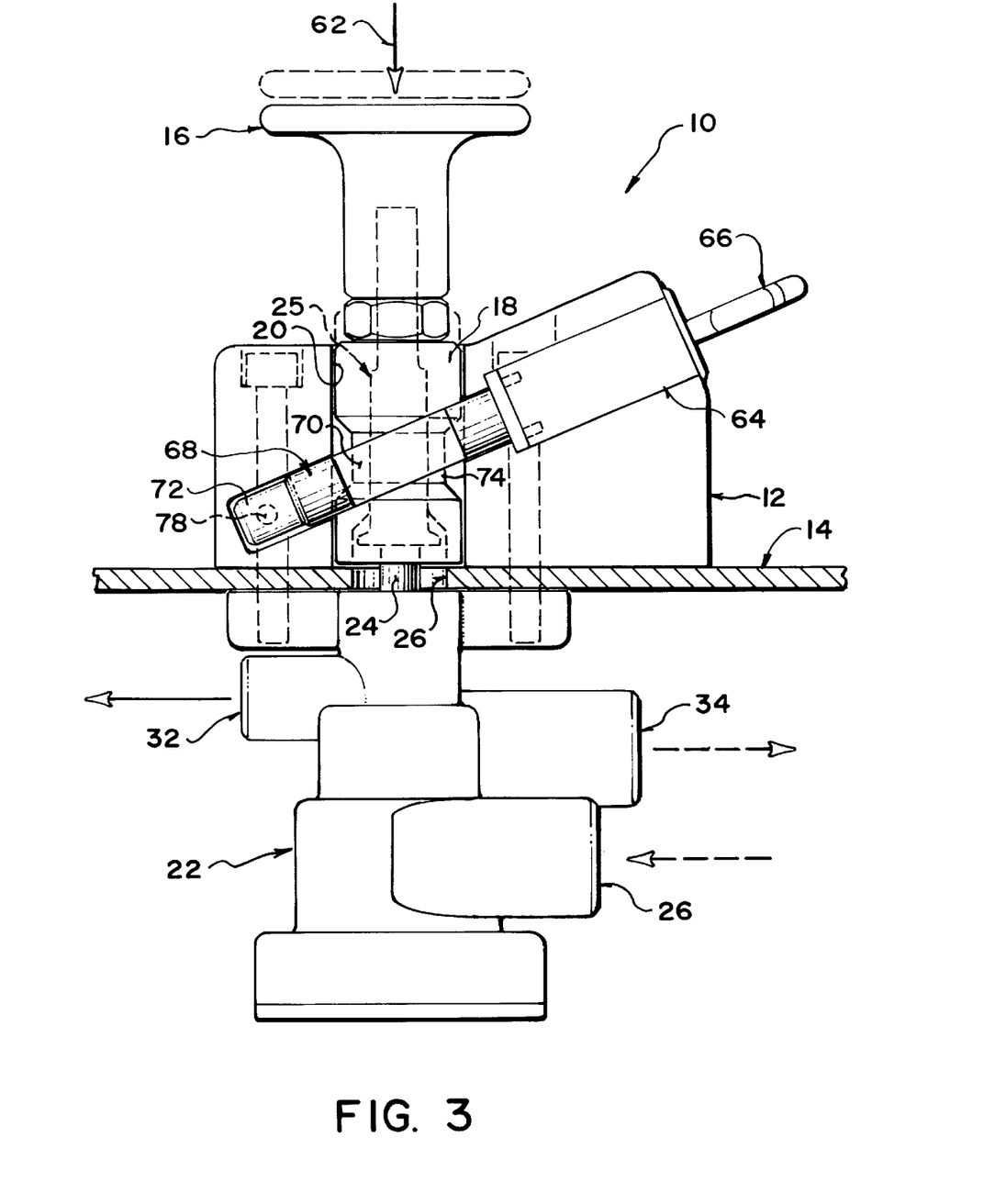
FIG. 3 is a partially sectioned side elevation view of the FIG. 1 apparatus, shown in the parking brake engaged position.

FIGS. 1–3 depict a first embodiment of the invention, namely ignition/brake lockout device 10. Body member 12 is mounted on vehicle control panel 14 (FIG. 3) in a location convenient for driver access. Control knob 16 is fixed on the upper end of plunger 18, which is slidably mounted in aperture 20 (FIG. 2) in body member 12. Parking brake control valve 22 (FIG. 3) is mounted on the underside of vehicle control panel 14, beneath body member 12.

Control valve 22 is equipped with an actuating rod 24 which projects upwardly from control valve 22, through aperture 26 in vehicle control panel 14 and is coupled to the lower end of plunger 18 (for example, by means of suitable threaded fittings respectively provided on plunger 18 and actuating rod 24).

Figure 4:
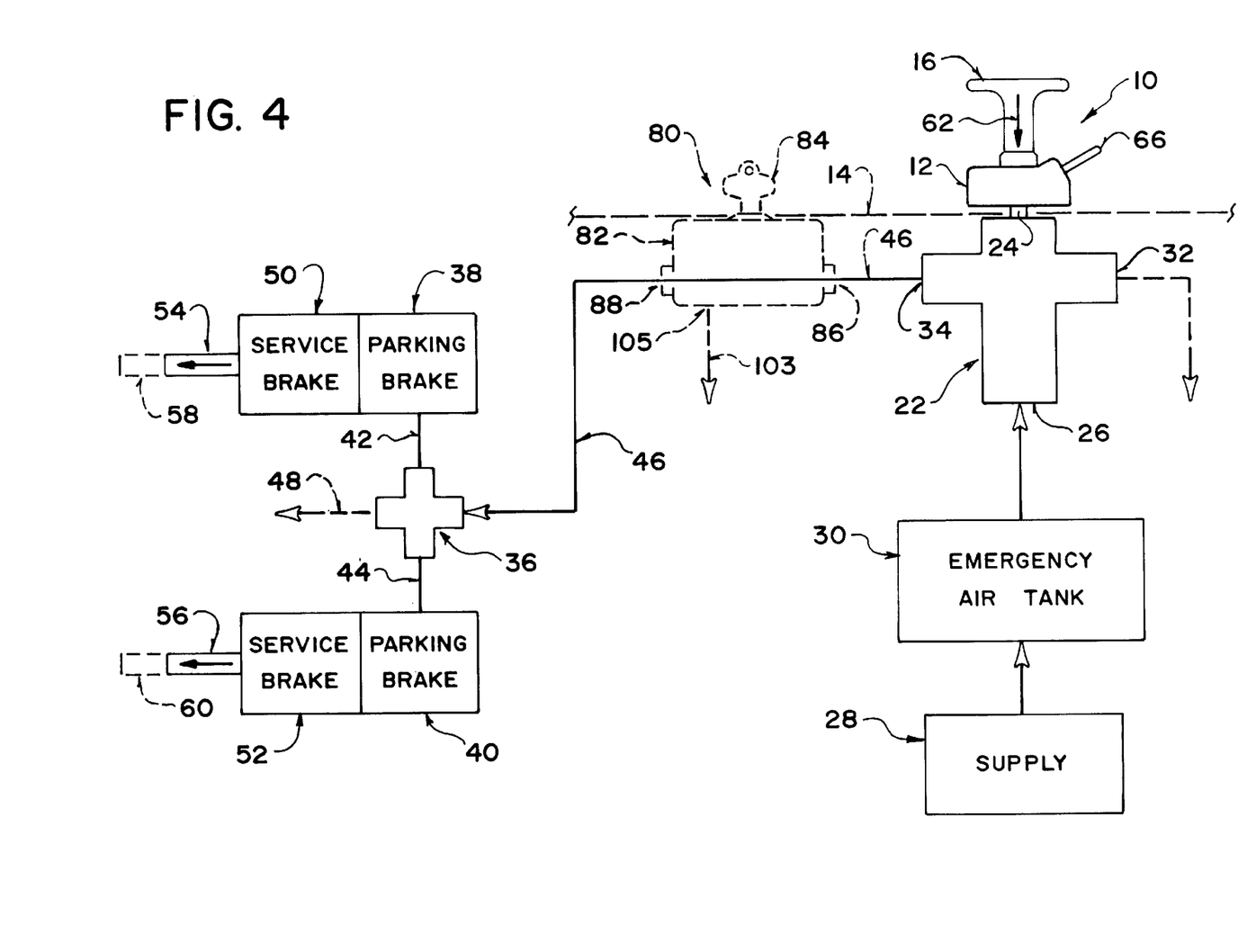
FIG. 4 is a fluidic/pneumatic circuit diagram schematically depicting the FIG. 1 apparatus and also schematically depicting an alternative embodiment of the invention.

Control valve 22 has an inlet port 26 which receives pressurized air from supply tank 28 and/or emergency air tank 30. Control valve 22 also has an exhaust outlet port 32 and a parking brake actuation port 34. The outlet ports of a conventional quick release valve 36 are respectively coupled to the air inlet ports of parking brakes 38, 40 via pressurized air lines 42, 44 respectively. Quick release valve 36's inlet port is coupled to control valve 22's parking brake actuation port 34 via pressurized air line 46. Quick release valve 36 also has an exhaust port, as indicated by dashed line arrow 48. The vehicle's service (i.e. primary) brakes 50, 52 are schematically illustrated in FIG. 4, but need not be further described. Solid line indicia 54, 56 respectively indicate disengagement of parking brakes 38, 40; whereas dashed line indicia 58, 60 respectively indicate engagement of parking brakes 38, 40.

The aforementioned components and indicia bearing drawing reference numerals 14–60 are conventional components of prior art air brake vehicle parking brake systems. Before describing the invention, the operation of a such prior art systems will first be explained with reference to FIGS. 3 and 4 and the aforementioned prior art components bearing drawing reference numerals 14–60 inclusive.

Parking brakes 38, 40 are disengaged by pulling knob 16 upwardly into the dashed line position indicated in FIG. 3. Knob 16 draws plunger 18 upwardly through aperture 20, simultaneously drawing control valve 22's actuating rod 24 upwardly through aperture 26 in vehicle control panel 14. Such upward movement of rod 24 actuates control valve 22 such that pressurized air which flows from supply tank 28 and/or emergency air tank 30 to inlet port 26 is routed to parking brake actuation port 34 and thence through line 46 to quick release valve 36. Quick release valve 36 delivers pressurized air from line 46 to lines 42, 44 respectively, pressurizing parking brakes 38, 40 so as to release their integral spring mechanisms (not shown) and thereby disengage the parking brakes.

Parking brakes 38, 40 are engaged by depressing control knob 16 into the solid outline position shown in FIG. 3, as indicated by arrow 62 in FIGS. 3 and 4 respectively. This forces plunger 18 downwardly through aperture 20 in body member 12, and forces control valve 22's actuating rod 24 downwardly through aperture 26 in vehicle control panel 14. Such downward movement of rod 24 actuates control valve 22 such that pressurized air which flows from supply tank 28 and/or emergency air tank 30 to inlet port 26 is unable to pass through control valve 22. Instead, pressurized air is exhausted from line 46 via control valve 22's exhaust outlet port 32. The resultant drop in air pressure within line 46 activates quick release valve 36, which allows air to be exhausted from parking brakes 38, 40 through lines 42, 44 as indicated by arrow 48. This in turn allows the spring mechanisms incorporated in parking brakes 38, 40 to deploy so as to engage parking brakes 38, 40 respectively.

Ignition/brake lockout device 10 is now described with further reference to FIGS. 1–4. Lock tumbler 64 is mounted within body member 12 in a location convenient for driver insertion of key 66. One end of shaft 68 is fixed to the inward end of lock tumbler 64 for rotation by operation of key 66, as hereinafter explained. A first recess or detent 70 is provided in shaft 68. An optional second recess or detent 72 may be provided at another convenient location on shaft 68 (as illustrated, but not necessarily, the end of shaft 68 opposite the end thereof which is affixed to lock tumbler 64). A circumferential groove 74 (FIG. 3) is also provided in plunger 18.

Key 66 can be rotated between the disengaged position shown in FIG. 1 and the engaged position shown in FIGS. 2 and 3. When key 66 is in the disengaged position (FIG. 1) shaft 68 is rotated such that first recess 70 intersects aperture 20 so as to permit vertical movement of plunger 18 through aperture 20 to engage or disengage parking brakes 38, 40 as previously explained. When key 66 is in the engaged position (FIGS. 2 and 3) shaft 68 is rotated such that the non-recessed portion of shaft 68 protrudes into aperture 20. Such protrusion is possible only if plunger 18 is positioned to locate groove 74 immediately adjacent the non-recessed portion of shaft 68, as seen in FIG. 3. Such positioning of plunger 18 and location of groove 74 occurs only when knob 16 is depressed; which, as previously explained, is the position in which parking brakes 38, 40 are engaged.

It can thus be seen that parking brakes 38, 40 can be engaged only if key 66 is rotated into the engaged position (FIGS. 2 and 3). This is an improvement in comparison to unkeyed prior art systems because it is less likely that a driver would leave the vehicle with key 66 in place on the vehicle's control panel 14. To remove key 66, the driver must rotate key 66 into the "engaged" position. However, key 66 can be rotated into the engaged position only if knob 16 and plunger 18 are depressed. Since such depression engages parking brakes 38, 40 it is apparent that device 10 reduces the potential for "roll away" of a driverless vehicle.

The likelihood that a driver will leave the vehicle with key 66 in place on the vehicle's control panel 14 can be further reduced if key 66 is required by the driver for some additional purpose. For example, some transit operators provide locked washrooms for the drivers' use. If key 66 is required to open a locked washroom door then it is more likely that a driver will remove key 66 before leaving the vehicle, thereby engaging parking brakes 38, 40 as aforesaid.

Device 10 can optionally be electrically connected to the vehicle's ignition circuit (not shown), or to the vehicle's electrical accessory circuit (not shown), etc. to further reduce the likelihood that a driver would leave a vehicle with key 66 in place on the vehicle's control panel 14. For example, if key 66 must be removed to shut off the vehicle's engine, then it is more likely that a driver will remove key 66 before leaving the vehicle (thereby engaging parking brakes 38, 40 as aforesaid) to shut off the engine in order to avoid leaving the vehicle unattended with the engine running. This can be achieved by positioning shaft 68's optional second recess 72 for rotation relative to optional micro-switch 76 (FIG. 2) and electrically connecting micro-switch 76 to the vehicle's ignition circuit (not shown). When key 66 is in the disengaged position shown in FIG. 1 (i.e. when parking brakes 38, 40 are disengaged) the non-recessed portion of shaft 68 adjacent second recess 72 is rotated to depress micro-switch 76's lever 78, thereby turning micro-switch 76 "on". This "on" signal can be used in any desired manner. For example, if micro-switch 76 is electrically connected into the vehicle's ignition circuit, then this "on" signal can be used to complete the vehicle's ignition circuit such that the vehicle's engine can be started. When key 66 is in the engaged position (FIGS. 2 and 3; i.e. when parking brakes 38, 40 are engaged) second recess 72 is rotated into the position shown in FIG. 2, whereupon a spring (not shown) within micro-switch 76 returns lever 78 to its disengaged position, thereby turning micro-switch 76 "off". If micro-switch 76 is electrically coupled into the vehicle's ignition circuit as aforesaid, then this "off" signal can be used to deactivate the vehicle's ignition circuit and prevent the engine from starting. This is an improvement in comparison to prior art systems lacking an ignition key because it is less likely that a driver would leave a vehicle with the engine running. The driver can only switch the vehicle's engine off by rotating key 66 into the disengaged position. However, key 66 can be rotated into the disengaged position only if knob 16 and plunger 18 are depressed. Since such depression engages parking brakes 38, 40 it is apparent that device 10 reduces the potential for "roll away" of a driverless vehicle.

Figures 5, 5A:
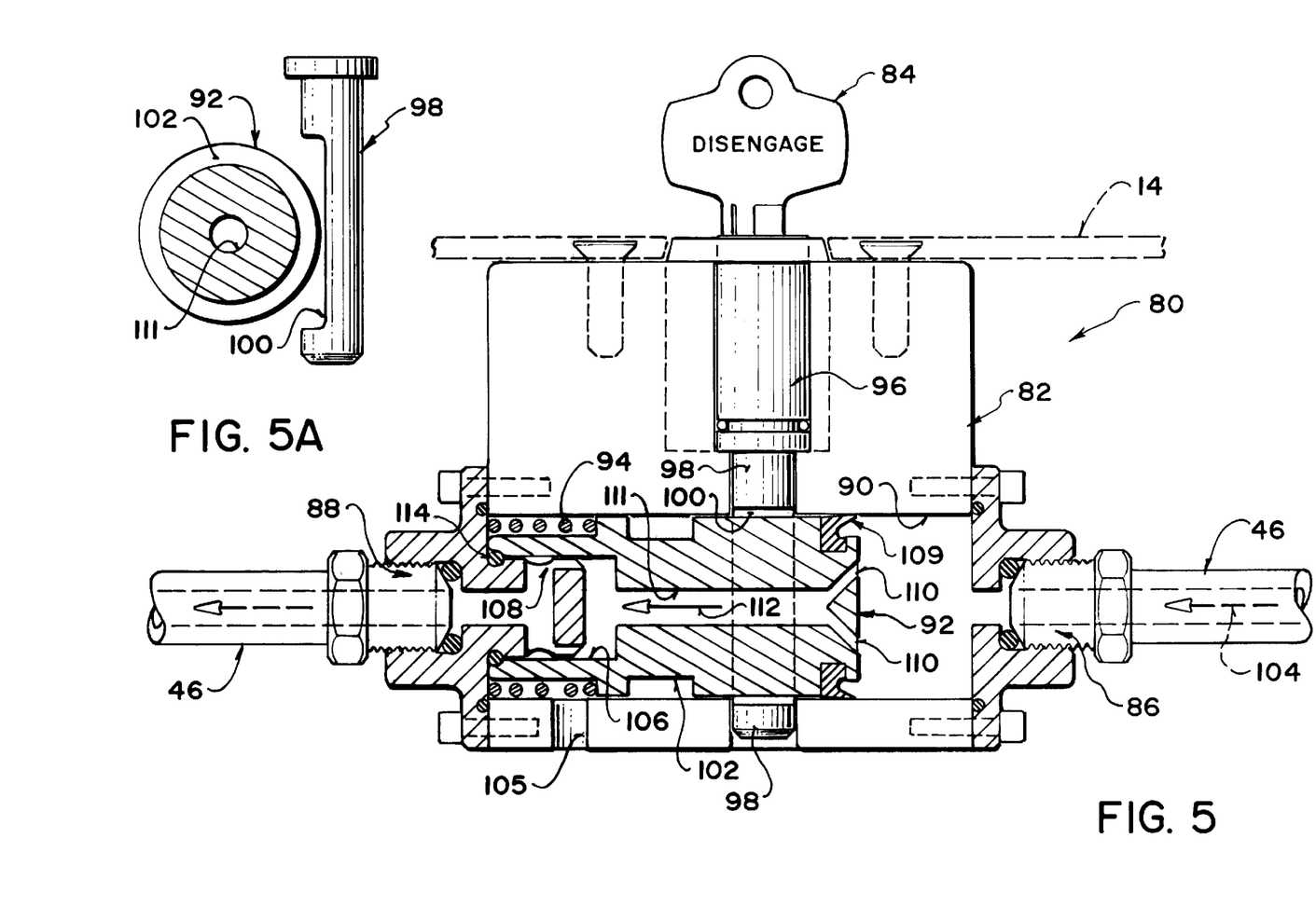
FIG. 5 is a partially sectioned side elevation view of an alternative embodiment of the invention, shown in the parking brake disengaged position.
FIG. 5A is an end elevation and sectional view of the key shaft and sliding valve portions of the FIG. 5 apparatus.
Figures 6, 6A:
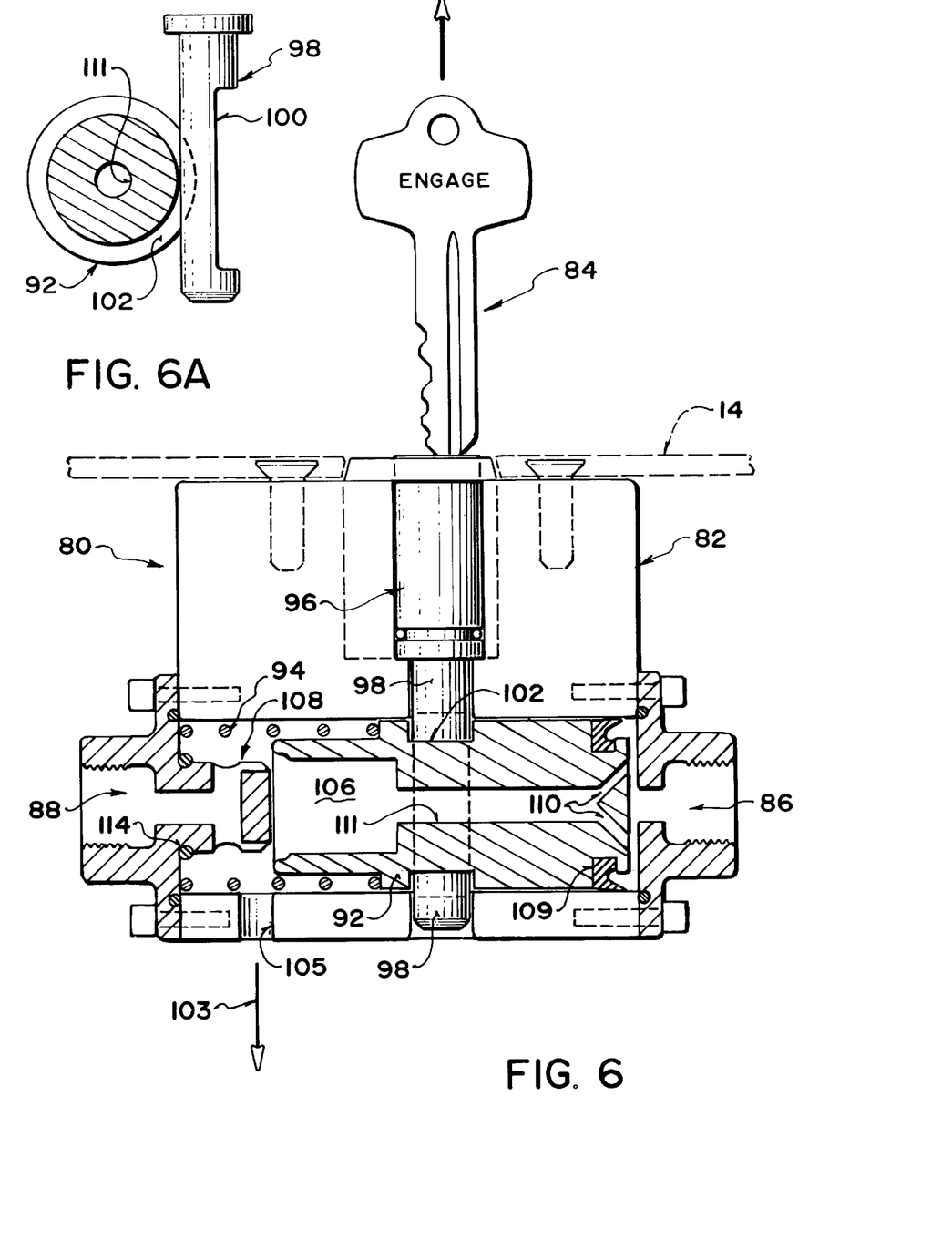
FIG. 6 depicts the FIG. 5 apparatus in the parking brake engaged position.
FIG. 6A is an end elevation and sectional view of the key shaft and sliding valve portions of the FIG. 6 apparatus.

FIGS. 5 and 6 depict an alternate embodiment of the invention, namely ignition/brake lockout device 80 which is also schematically illustrated in dashed outline in FIG. 4. Either one but not both of ignition/brake lockout devices 10, 80 are utilized in a single vehicle. If device 80 is utilized, then the aforementioned prior art components bearing drawing reference numerals 14–60 inclusive are also utilized. Device 80 can for example be used in situations where it is desired to retain an existing parking brake mechanism incorporating the aforementioned prior art components bearing drawing reference numerals 14–60.

Ignition/brake lockout device 80 incorporates body member 82 which is mounted beneath vehicle control panel 14 in a convenient location for driver actuation of key 84 so as to control pressurized air passage between inlet port 86 and outlet port 88 and thus control delivery of pressurized air from supply tank 28 and/or emergency air tank 30 through pressurized air line 46 to quick release valve 36. An aperture 90 is provided in body member 82, between ports 86, 88. Shuttle valve member 92 is provided in aperture 90 for slidable displacement there-along as hereinafter explained. Spring 94 biases valve member 92 toward inlet port 86, as shown in FIG. 6. Lock tumbler 96 is mounted in body member 82 to receive key 84. Shaft 98 is fixed to the inward end of lock tumbler 96 for rotation by operation of key 84, as hereafter explained. A recess 100 is provided in shaft 98 and a circumferential groove 102 is provided around a central portion of valve member 92.

In operation of ignition/brake lockout device 80, knob 16 must be depressed to allow key 84 to be rotated between the disengaged position shown in FIGS. 5 and 5A, and the engaged position shown in FIGS. 6 and 6A. When key 84 is in the disengaged position, shaft 98 is rotated so that recess 100 faces aperture 90 with no portion of shaft 98 obstructing aperture 90, thereby permitting slidable displacement of valve member 92 along aperture 90. If knob 16 is raised, pressurized air flows from supply tank 28 and/or emergency air tank 30 through control valve 22 as previously explained to parking brake actuation port 34, and air is delivered via line 46 to device 80's inlet port 86, as indicated by arrow 104. Pressurized air entering inlet port 86 forces valve member 92 toward outlet port 88, overcoming the biasing force of spring 94 such that cylindrically apertured portion 106 of valve member 92 is positioned over nozzle 108 which protrudes from outlet port 88 into aperture 90. Pressurized air entering inlet port 86 is thus able to flow through aperture 90, through valve member 92's inlet orifice 110 into bore 111 and thence into cylindrical aperture 106, as indicated by arrow 112.

Orifice 110 is sized to allow sufficient pressure to build up behind valve member 92 (i.e. to the right of valve member 92, as viewed in FIG. 5) to overcome the biasing force of spring 94, as aforesaid. O-ring 114 provides releasable sealing engagement between valve member 92 and nozzle 108, such that pressurized air entering cylindrical aperture 106 is contained and flows through nozzle 108 and through outlet port 88 into pressurized line 46 and thence to quick release valve 36, thereby disengaging parking brakes 38, 40 as previously explained. Sweep seal 109 prevents air leakage between the outer surface of valve member 92 and the inner surface of aperture 90.

When key 84 is in the engaged position shown in FIG. 6, shaft 98 is rotated such that its non-recessed portion protrudes into and obstructs aperture 90, as seen in FIGS. 6 and 6A. Such protrusion is possible only if valve member 92 is positioned within aperture 90 to position groove 102 immediately adjacent shaft 98 as seen in FIG. 6. Such positioning is possible only if pressurized air is not being delivered from control valve 22 to device 80's inlet port 86 such that spring 94 is able to bias valve member 92 into the position shown in FIG. 6, in which air is exhausted from aperture 106 through exhaust orifice 105, as indicated by arrow 103. However, spring 94 can bias valve member 92 into the position shown in FIG. 6 only if knob 16 is depressed to force actuating rod 24 downwardly to block passage of pressurized air through control valve 22 and engage parking brakes 38, 40.

Exhaust orifice 105 is sized so that it is sufficiently large to prevent excessive pressure build up within aperture 90 if knob 16 is pulled upwardly after key 84 is removed from device 80, and sufficiently small to permit adequate pressure to build up behind valve member 92 (i.e. to the right of valve member 92, as viewed in FIG. 5) to overcome the biasing force of spring 94, as aforesaid.

It can thus be seen that parking brakes 38, 40 can be engaged only if key 84 is rotated into the engaged position (FIGS. 6 and 6A). This is an improvement in comparison to unkeyed prior art systems because it is less likely that a driver would leave the vehicle with key 84 in place on the vehicle's control panel 14. To remove key 84, the driver must rotate key 84 into the "engaged" position. However, key 84 can be rotated into the engaged position only if knob 16 and plunger 18 are depressed. Since such depression engages parking brakes 38, 40 it is apparent that device 80 reduces the potential for "roll away" of a driverless vehicle.

Figure 7:
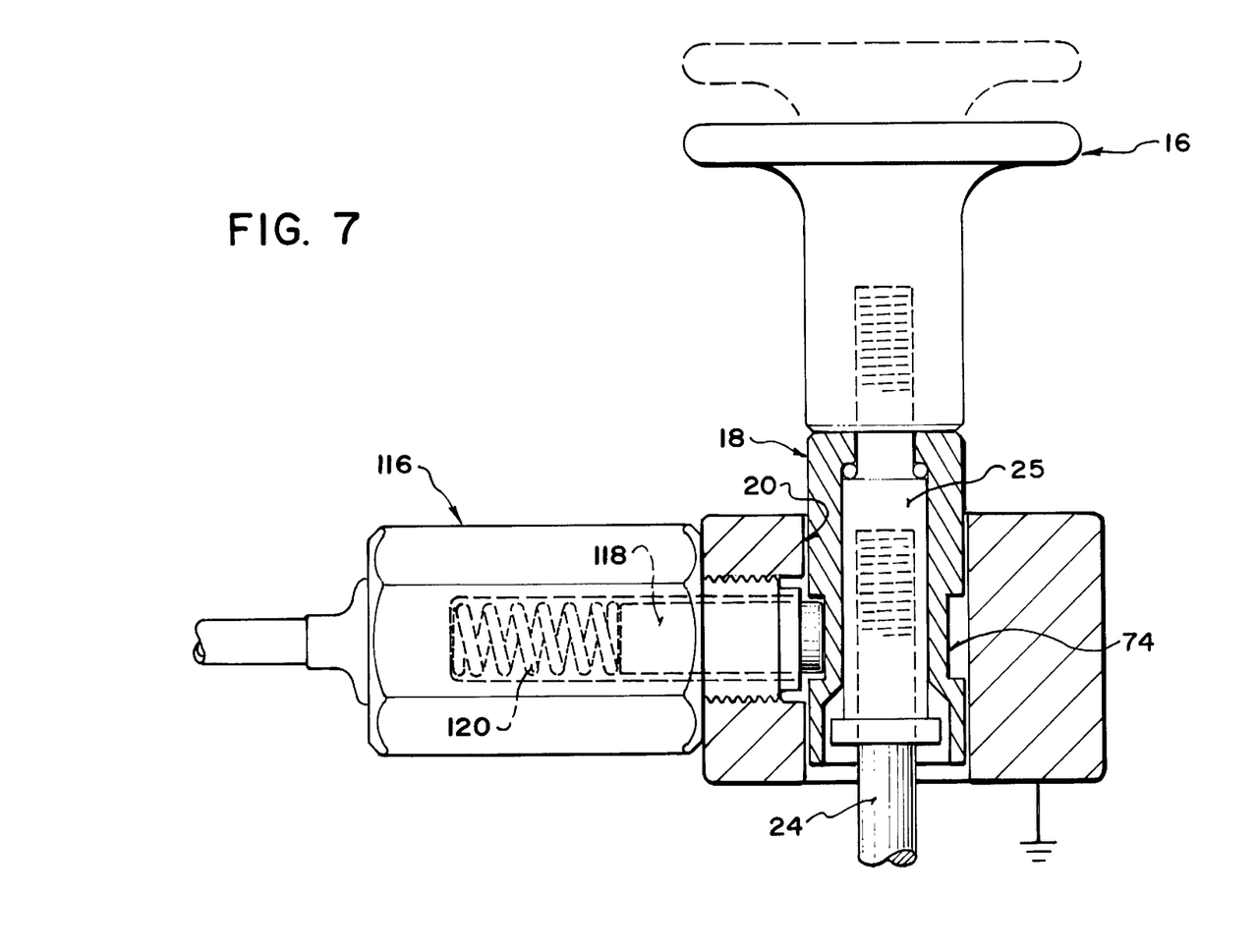
FIG. 7 is a partially sectioned side elevation view of a further alternative, solenoid-actuated embodiment of the invention.

Device 80 can be optionally be electrically connected to the vehicle's ignition circuit (not shown), or to the vehicle's electrical accessory circuit (not shown), etc. to further reduce the likelihood that a driver would leave a vehicle with key 84 in place on the vehicle's control panel 14. This can be achieved as previously described for device 10, by providing a second recess (not shown) in shaft 98 for rotation relative to a micro-switch (not shown) and electrically connecting the micro-switch to the vehicle's ignition circuit. FIG. 7 depicts a further alternative embodiment incorporating solenoid 116 which can be coupled to plunger 18 and further electrically coupled to the vehicle's ignition circuit. This is achieved by mounting solenoid 116 on body member 12 such that solenoid 116's slidable plug 118 can be biased by spring 120 into plunger 18's circumferential groove 74 when knob 16 is depressed as illustrated in FIG. 7. More particularly, when the vehicle's ignition is "off", solenoid 116 is de-energized, allowing spring 120 to bias plug 118 into groove 74. When the vehicle's ignition is "on", solenoid 116 is energized and withdraws plug 118 from groove 74, overcoming the biasing force of spring 120, allowing knob 16 to be raised into the dashed outline position shown in FIG. 7 so as to disengage parking brakes 38, 40.

As will be apparent to those skilled in the art in the light of the foregoing disclosure, many alterations and modifications are possible in the practice of this invention without departing from the spirit or scope thereof. For example, if plunger 18 is non-rotatable then instead of providing a circumferential groove 74 in plunger 18 one need only recess the portion of plunger 18 adjacent the portion of shaft 68 bearing first recess 70. Similarly, if valve 92 is non-rotatable then instead of providing a circumferential groove 102 in valve 92, one need only recess the portion of valve 92 adjacent the portion of shaft 98 bearing recess 100. Accordingly, the scope of the invention is to be construed in accordance with the substance defined by the following claims.

What is claimed is:

1. A vehicle brake lockout device for coupling between a pneumatically-operable vehicle parking brake and a control valve actuated by a pressurized air source, said control valve having a plunger movable between a brake-disengaging position in which pressurized air flows from a pressurized air supply through said control valve to said parking brake and a brake-engaging position in which said pressurized air flow is prevented, said device comprising:
    (a) a shaft rotatable with respect to said plunger, said shaft having a recessed portion and a non-recessed portion;
    (b) a second recess in and between opposed ends of said plunger;
    (c) a key removably couplable to said shaft to rotate said key and said shaft between:
        (i) an engaged position in which said non-recessed portion of said shaft protrudes into said second recess while said plunger is in said brake-engaging position, preventing movement of said plunger into said brake-disengaging position, said shaft being rotatable into said engaged position only while said plunger is in said brake-engaging position; and,
        (ii) a disengaged position in which said recessed portion of said shaft intersects said second recess, permitting movement of said plunger between said brake-disengaging and said brake-engaging positions.

2. A vehicle brake lockout device as defined in claim 1, further comprising a switch coupled to said shaft, said switch having a first electrical conductivity state when said key is rotated into said engaged position and a second electrical conductivity state when said key is rotated into said disengaged position.

3. A vehicle brake lockout device as defined in claim 2, further comprising a second recessed portion on said shaft positioned adjacent said switch, said switch actuated into said first electrical conductivity state by rotation of said second recessed portion on said shaft into contact with said switch, said switch actuated into said second electrical conductivity state by rotation of said second recessed portion on said shaft out of contact with said switch.

4. A vehicle brake lockout device as defined in claim 1, further comprising a solenoid electrically connectible to an ignition circuit of said vehicle, said solenoid having a first operating state when said ignition circuit is energized and a second operating state when said ignition circuit is de-energized, said solenoid further comprising a plug movable between a first position in which said plug is withdrawn from said second recess when said solenoid is in said first operating state and a second position in which said plug protrudes into said second recess when said solenoid is in said second operating state.

5. A vehicle brake lockout device for coupling in a pressurized air conduit extending between a pneumatically-operable vehicle parking brake and a control valve, said control valve having a plunger movable between a brake-disengaging position in which pressurized air flows from a pressurized air supply through said control valve and said conduit to said parking brake and a brake-engaging position in which said pressurized air flow is prevented, said device comprising:
    (a) a rotatable shaft having a recessed portion and a non-recessed portion;
    (b) a valve member having a second recess between opposed ends of said valve member, said valve member pneumatically coupled to said conduit and slidably movable with respect to said shaft between:
        (i) an air-blocking position in which said second recess is positioned adjacent said shaft and in which said air flow through said conduit is prevented;
        (ii) an air-passing position in which said second recess is positioned away from said shaft and in which said air flow through said conduit is enabled;
    (c) a spring biasing said valve member into said air-blocking position when said plunger is in said brake-engaging position, and wherein said pressurized air flow through said conduit overcomes said biasing to permit movement of—said valve member into said air-passing position when said plunger is in said brake-disengaging position;
    (d) a key removably couplable to said shaft to rotate said shaft between:
        (i) an engaged position in which said non-recessed portion of said shaft protrudes into said second recess while said plunger is in said brake-engaging position, preventing movement of said valve member into said air-passing position, said shaft being rotatable into said engaged position only while said valve-member is in said air-blocking position; and,
        (ii) a disengaged position in which said recessed portion of said shaft intersects said second recess, permitting movement of said valve member between said air-passing and said air-blocking positions.

6. A vehicle brake lockout device as defined in claim 5, wherein said valve member is slidably mounted in an aperture, said device further comprising an exhaust orifice in said aperture, said exhaust orifice sized to prevent excessive pressure build up within said aperture while said key is in said engaged position; said exhaust orifice further sized to permit adequate pressure build up within said aperture while said key is in said disengaged position to move said valve member between said air-passing and said air-blocking positions.

* * * * *